United States Patent [19]
Schubert

[11] Patent Number: 6,002,125
[45] Date of Patent: Dec. 14, 1999

[54] PRODUCT SCANNING APPARATUS AND METHOD USING A PLURALITY OF EIGHT SENSORS OVER THE ENTIRE WIDTH OF A BACKGROUND SURFACE MEANS

[75] Inventor: Ralf Schubert, Crailsheim, Germany

[73] Assignee: Gerhard Schubert GmbH, Crailsheim, Germany

[21] Appl. No.: 08/989,511

[22] Filed: Dec. 12, 1997

[30] Foreign Application Priority Data

Dec. 12, 1996 [DE] Germany .......................... 196 51 717

[51] Int. Cl.⁶ .................................................. G01D 21/04
[52] U.S. Cl. ................ 250/223 R; 356/375; 250/559.29
[58] Field of Search .......................... 250/223 R, 559.23, 250/559.29; 356/375; 198/502.3, 958; 209/576, 587, 588

[56] References Cited

U.S. PATENT DOCUMENTS

| | | | |
|---|---|---|---|
| 4,147,930 | 4/1979 | Browne et al. ..................... | 250/223 R |
| 5,216,258 | 6/1993 | McConnell ......................... | 250/559.29 |

FOREIGN PATENT DOCUMENTS 0749 902 A1  12/1996  European Pat. Off. .

*Primary Examiner*—Stephone Allen
*Attorney, Agent, or Firm*—Chapman and Cutler

[57] ABSTRACT

In an apparatus and a method for optically determining the position of products by means of light-sensitive sensors on a background moving relative thereto such as a conveyor belt, at least one light source radiating light onto the conveyor belt is arranged along at least one scanning line extending transversely with respect to the direction of movement. At least one row of light-sensitive sensors, which row is arranged along at least one scanning line, is operable to register a light effect caused by products passing between the light source and the sensors.

27 Claims, 2 Drawing Sheets

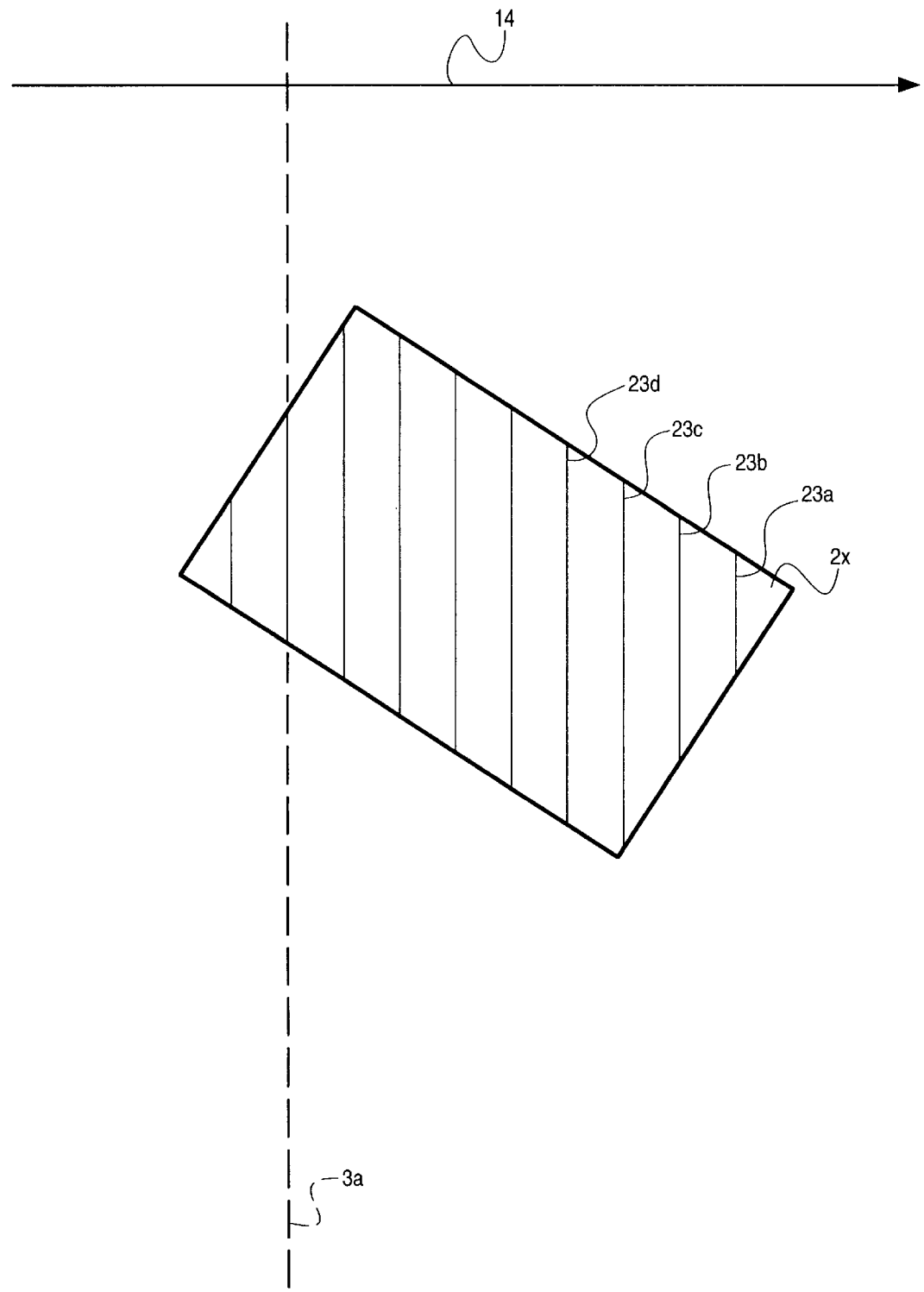

PRODUCT SCANNING APPARATUS AND METHOD USING A PLURALITY OF EIGHT SENSORS OVER THE ENTIRE WIDTH OF A BACKGROUND SURFACE MEANS

FIELD OF THE INVENTION

The invention concerns an apparatus and a method for optically determining the position of products against a background or a substrate on which the products may be disposed.

BACKGROUND OF THE INVENTION

Determining the position of products against a background or a substrate can be an aspect of major significance whenever, in a production procedure, products which are positioned in an unregulated or random fashion are to be handled automatically, for example more particularly but not exclusively when packaging products.

A typical situation of use in this respect involves a background or substrate in the form of a conveyor belt, by means of which the individual products that have been produced are conveyed out of a production installation to a packaging station where they have to be automatically gripped, for example by means of suitable gripper devices or other handling devices, and transposed into packaging containers, for example trays, which are ready to receive them in pockets which are generally pre-shaped therein.

A difficulty in this respect is that the individual products are generally disposed on the conveyor belt in positions which cannot be determined beforehand and also point in different directions, thus involving different directional orientations. In contrast, the products have to be deposited in the packaging containers or trays not only in the correct respective positions relative thereto but also in a given positional orientation, depending on the respective product involved and the configuration of the respective tray or the pockets in the tray. Furthermore that situation is often made more difficult by virtue of the fact that a plurality of different kinds of products may be supplied in a randomly distributed arrangement on the product-carrying conveyor belt, but those products are required to be disposed in the individual respective trays in defined arrangements.

In this respect reference may be made for example to EP-A-95-115 548 which, for the above-indicated purpose, discloses a system in which positioned laterally beside a moving conveyor belt for the products are trays which can also be moved, wherein products can be transposed from the conveyor belt into the trays by means of one or more packaging robots which are disposed beside the conveyor belt and which at the free end of their arm have a gripper or a so-called picker, in the form of a vacuum suction device. In order therefore to be able previously to notify the robot of the access position on the conveyor belt, a line camera is arranged upstream of the robots in the direction of movement of the conveyor belt, and above the conveyor belt. The camera is operable to establish along a scanning line extending transversely to the direction of transportation movement of the conveyor belt and over the entire width thereof, whether a product is passing through beneath the camera, while the camera can possibly also determine the rotational orientation of the detected product. In conjunction with information about the speed of movement of the conveyor belt and the spacing between the scanning line and the position of the robot, the required access position and the respectively associated time for gripping a given product on the conveyor belt can then be communicated by means of a computer to the robots which operate at a position downstream of the line camera.

When the conveyor belt is for example about 1.5 meters or 2 meters in width, a line camera of that kind is suspended at a distance of about 1 meter above the conveyor belt. The result of this is that the light beams which scan or sense the outermost edges of the conveyor belt are then very far from being in a condition of extending parallel to each other, but meet the ocular or lens of the camera at an angle of for example 90°.

That gives rise to optical distortion effects and parallax phenomena and means on the one hand that each time that the camera is re-adjusted, re-focussed again, a calibration operation has to be performed again, that is to say a test run, during which the machine has to be shut down and cannot operate in its normal mode.

A further disadvantage in this respect is that, particularly when dealing with relatively high products which are disposed at a small spacing relative to each other on the conveyor belt, the fact that the beams impinge at an inclined angle means that the lower edge of a product can be masked or covered from the point of view of the camera by the adjacent upward edge of another product, with the result that those two products cannot be detected as being two separate products. That will result in malfunctions on the part of the machine.

Furthermore a line camera of that kind must have a sensor with a relatively strong resolution power, in most cases a CCD-sensor, as, when dealing with a conveyor belt which is 2 meters in width, it must be possible to achieve reasonably fine scanning in a for example 0.5 mm scanning pattern or raster. That means that 4,000 pixels must be provided in a small area on the CCD-sensor of the camera in the transverse direction of the conveyor belt, and that also makes line cameras of that kind relatively expensive.

SUMMARY OF THE INVENTION

An object of the present invention is to provide an apparatus for optically determining the position of products against a background, wherein optical position determination is effected as far as possible without optical distortion and in a simple and reliable manner.

Another object of the present invention is to provide an apparatus for optically determining the positions of products by sensors against a background which is simple and inexpensive to produce and maintain.

Still another object of the present invention is to provide an apparatus for optically determining the positions of products on a moving conveyor belt which operates reliably and with sound results as far as possible without expensive calibration procedures when replacing or adjusting components of the assembly.

A further object of the present invention is to provide a method of optically detecting the positions of products by means of light-sensitive sensors against a moving background such as a conveyor belt which affords reliable detection results in relation to a range of different products.

Yet a further object of the present invention is to provide a method of optically detecting the positions of products on a moving substrate which can detect the product positions in a reliable and simple manner involving an uncomplicated apparatus layout.

In accordance with the present invention in the apparatus aspect the foregoing and other objects are attained by an apparatus for optically determining the position of products by means of light-sensitive sensors on a background or substrate moving relative thereto, for example a conveyor belt, comprising at least one light source adapted to radiate light onto the conveyor belt, the light source being arranged along at least one scanning line extending transversely with respect to the direction of movement of the conveyor belt. The apparatus further includes at least one row of light-sensitive sensors, which is arranged along at least one of the sensing lines. The sensors are operable to register the light effect caused by the products passing through between the light source and the light-sensitive sensors.

In accordance with the principles of the invention in the method aspect the foregoing and other objects are attained by a method of optically detecting the positions of products by means of light-sensitive sensors on a background which is movable relative thereto, for example a conveyor belt, wherein light is radiated onto the conveyor belt on at least one scanning line which extends transversely with respect to the direction of movement. The light effect produced by the products is registered by light-sensitive sensors arranged along the entire scanning line.

As will become apparent from the description of a preferred embodiment of the present invention as set forth hereinafter, the fact that the light-sensitive sensors are not concentrated in a small region but substantially along the entire scanning line or lines, that is to say extending transversely over the entire conveyor belt, means that the light beams impinging on the light-sensitive sensors extend in substantially mutually parallel relationship without spread or scatter from or to an eye piece or lens.

For that purpose therefore the light-sensitive sensors which will generally be in the form of CCD-sensors are disposed in one or more scanning lines transversely with respect to the conveyor belt, and record the light effects produced by daylight or additionally provided illumination by virtue of the products, and convert such light effects into items of product-positional information, aided by a computer. Within the bar sensors arranged in strip form, the individual, substantially punctiform CCD-sensors are arranged in a row. When using CCD-contact sensors, it is advantageously possible to use bar-shaped CCD-contact sensors, in the form of ready-for-use units, as are already produced and inexpensively available in large numbers for use in commercially obtainable scanners.

CCD-contact sensors of that kind are for example of a length of somewhat more than 200 mm and have 1,728 pixels, that is to say individual sensors, distributed over that length, thereby affording a degree of resolution in the transverse direction of the conveyor belt of about 0.1 mm. In that situation the line frequency of such a bar sensor is 400 Hz with a pixel frequency of about 1 MHz and a dynamic of 1:100. In that respect the line frequency of 400 Hz is the crucial value as it is only with that line frequency that the detection result of the entire bar sensor can be transmitted to a computer connected to the arrangement, and a fresh observation procedure can be implemented. It is in relation to the speed of travel of the conveyor belt that this gives the spacing, in the direction of movement of the conveyor belt at which the scanning operations are effected.

As however the products involved are generally products which are more than 1 cm in size, levels of resolution and repetition frequencies of that kind are not only adequate but, for example when dealing with products which have a non-round, for example quadrangular base surface, they even make it possible to detect the rotational orientation of the product with respect to the direction of movement of the conveyor belt.

Preferably the additional lighting which serves to improve the light effects produced by the products is also of a linear configuration and is disposed transversely with respect to the direction of movement of the conveyor belt, preferably with light beams which impinge on the conveyor belt in mutually parallel and substantially perpendicular relationship. That can be achieved by means of strip-shaped illuminating bodies, possibly aided by a suitable strip-shaped lens or a suitably shaped reflector arranged behind the illuminating body.

When using the commercially available and therefore inexpensive CCD-contact sensors described above, they must be disposed in very close relationship with the product to be scanned. Preferably therefore the contact sensors are disposed beneath the conveyor belt and the conveyor belt is illuminated from above, that is to say, from the opposite side to the sensors, and the conveyor belt itself is in that case at least partially transmissive at least in respect of the light frequencies which are imitated by the illuminating source. In that case, in a preferred feature a glass plate is arranged between the underside of the conveyor belt and the CCD-sensors, that is to say in particular the CCD-contact sensors, with the CCD-sensors being put directly onto the glass plate. In that case, besides the lenses which are in part already installed directly in front of the individual CCD-sensors, the assembly does not involve any optical systems, and in particular it does not have any optical system which provides for a strong beam focussing action in the transverse direction of the conveyor belt.

As the conveyor belts are substantially wider than the length of the bar sensors which are inexpensively commercially available, the bar sensors are preferably arranged on two scanning lines which are spaced in the direction of movement of the conveyor belt, so that there are no scanning gaps as considered in the transverse direction, that is to say the bar sensors on the one scanning line cover over the gaps between the bar sensors on the other scanning line.

As there is a considerable price difference between CCD-sensors, including CCD-contact sensors, if they can only register light-dark differences, in comparison with such sensors which are also capable of registering color differences, in a preferred embodiment operation is conducted only with light-dark sensors. If additional color recognition or detection is required, for example in regard to the surface configuration of the individual products on a conveyor belt, color detection is additionally effected for that purpose, from the top side of the conveyor belt. That can either be effected once again by means of a line camera as has been described hereinbefore and which is disposed at a central position in suspended relationship above the conveyor belt and which has a strongly focussing optical system. In that case however the disadvantage caused thereby is much less serious, in comparison with the above-discussed previous arrangement of such a camera. On the one hand a line camera of that kind which serves only for color detection on the surface of the products only has to have a substantially lower degree of resolution than is required for precisely determining positions of the products. On the other hand, what is involved here is the coloring of the top side of the products, so that the operational procedure involved does not concern scanning the bottom edges of the products, for the purposes of determining the position thereof, with the concomitant disadvantage that those bottom edges of the products can be masked by adjacent top edges of products disposed therebeside.

Another possible way of effecting color detection or recognition is a procedure whereby suitable surface sensing cameras having color sensors or gray sensors which have only a small detection or recognition area and which thus involve a small number of individual sensors and a low degree of resolution are disposed directly at the arm of an individual robot for gripping products from the conveyor belt, that is to say, the color sensors are disposed in the proximity of the gripping means of the robot, and effect color detection only in their limited field of view, that is to say they effect color recognition in respect of the products only when the robot arm has already moved closely adjacent to the respective product for which it had already been targeted by the controlling computer, on the basis of previous detection of the position of the respective product by CCD-sensors. On this occasion each product is individually analyzed in a close-up.

When using commercially available bar-shaped CCD-contact sensors, the level of resolution for products which are several centimeters in size is even generally excessive so that, to reduce the amount of computing work required, a plurality adjacently disposed individual sensors for determining product positions can be combined into a single sensor.

Another possible arrangement in this respect involves arranging the illuminating means and the light-sensitive sensors on the same side of the conveyor belt, that is to say generally on the top side of the conveyor belt on which the products are carried.

That arrangement means that there is no need to have a light-transmissive conveyor belt and the risk of operation being affected by soiling or contamination of the conveyor belt is eliminated. It will be appreciated that this arrangement requires sensors which can also be arranged at a relatively large spacing relative to the top side of the products, or the products passing through the apparatus on the conveyor belt must be of exactly the same height.

Further objects, features and advantages of the invention will be apparent from the following description of a preferred embodiment thereof.

BRIEF DESCRIPTION OF THE DRAWING

FIG. 3 shows the result obtained when a product indicated at 2x passes through a scanning line indicated at 3a.

DESCRIPTION OF THE PREFERRED EMBODIMENT

Figure 1:
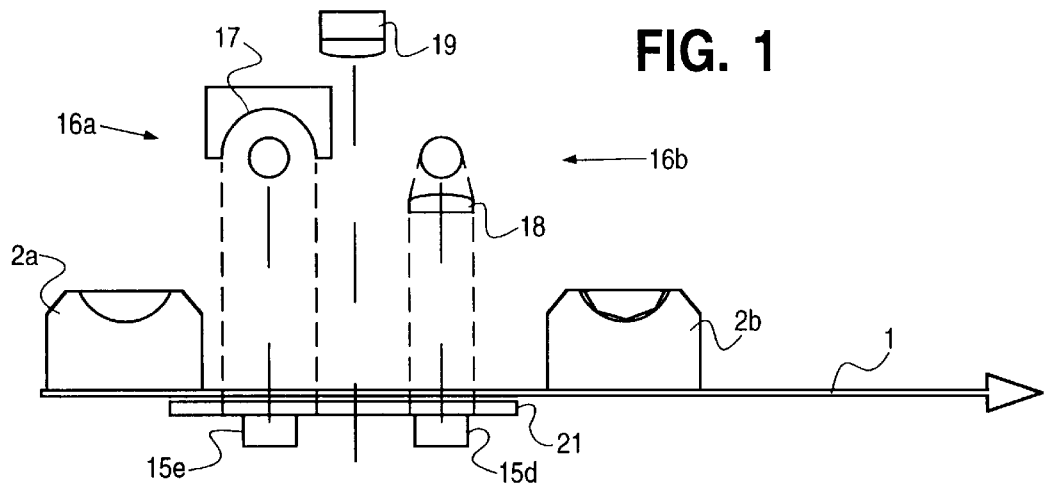
FIG. 1 is a side view of a moving conveyor belt carrying products thereon.

Referring firstly to FIG. 1, reference numeral 1 therein generally identifies a background surface in the form of a conveyor belt which is moving in a direction of movement indicated by the arrow 14 and on which a plurality of products 2a, 2b, . . . are disposed in an irregularly or randomly distributed array and which are also moved along with the conveyor belt 1.

Figure 2:
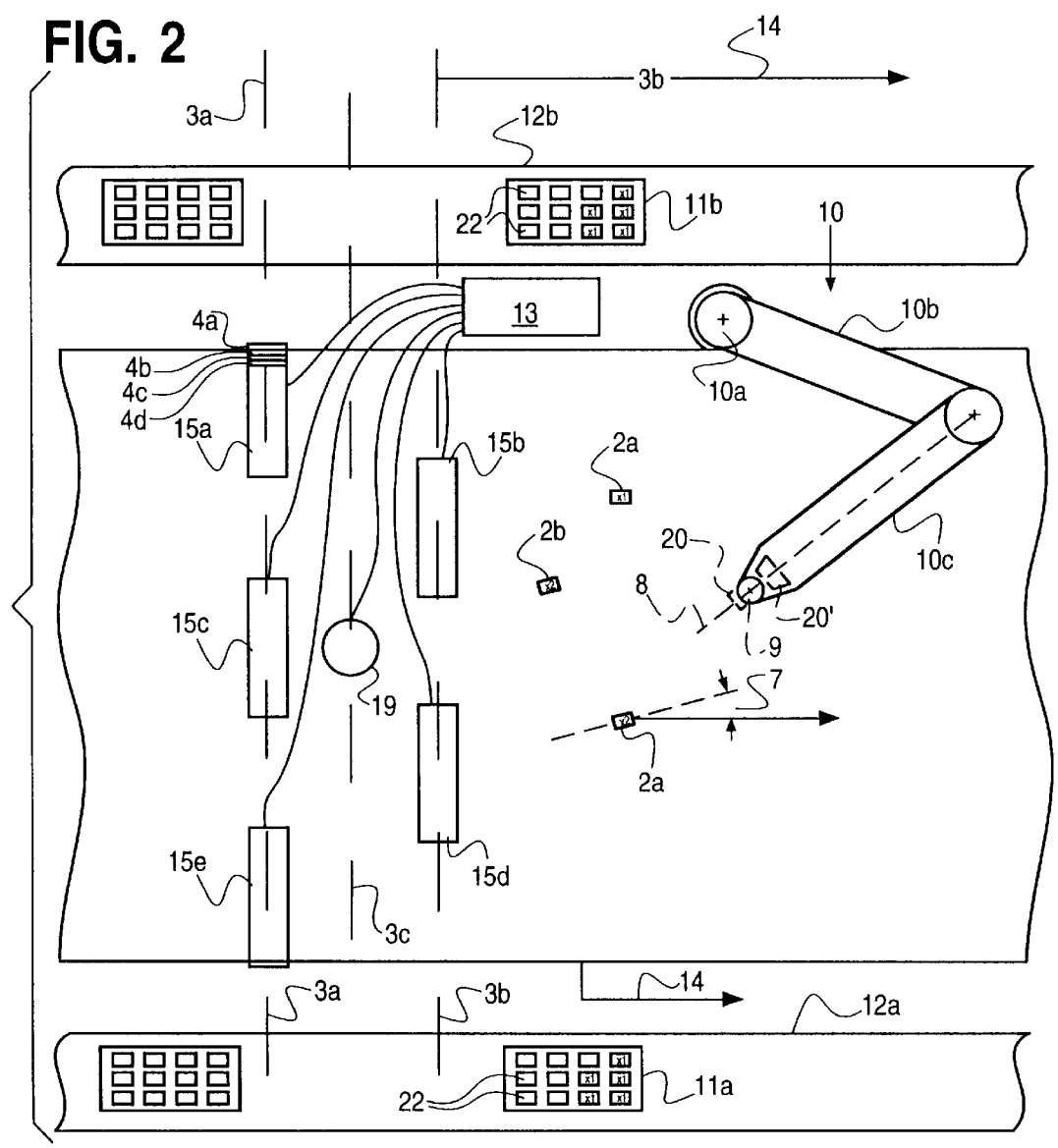
FIG. 2 is a plan view of the conveyor belt in conjunction with an embodiment of the apparatus according to the invention.

As can best be seen from FIG. 2 the products 2a, 2b on the conveyor belt 1 have to be transposed into suitable containers shown in the form of trays 11a, 11b which are supplied in parallel relationship beside the conveyor belt 1 and more specifically into cavities provided in the trays, that is to say generally in the form of especially shaped recesses for receiving the products. In that case the trays 11a, 11b are preferably transported and moved on tray belts indicated at 12a and 12b on respective sides of the conveyor belt 1.

The operation of transposing products from the belt 1 into the trays is effected by means of a for example two-armed gripping robot indicated generally at 10. The base of the gripping robot 10 as indicated at 10a, is disposed in a fixed position beside the conveyor belt 1 while in relation thereto an upper arm 10b of the gripping robot 10 is pivotable at least about a vertical axis. Reference 10c denotes a further arm portion which is pivotable relative to the arm portion 10b.

Arranged at the front or free end of the arm portion 10c is a gripping device 9, frequently for example in the form of a vacuum suction device, which can possibly additionally be rotatable about a vertical axis.

The gripping device 9 is required to go to a given position on the moving conveyor belt 1. The position to which the gripping device 9 is required to move has been previously communicated thereto by a computer indicated at 13, for a given moment in time. For that purpose, the position of the individual products 2a, 2b on the conveyor belt 1 must be known to the computer 13 at a given moment in time, and likewise the speed of travel of the conveyor belt 1.

To achieve that, upstream of the robot or robots 10 the apparatus provides for optically determining the position of products on the conveyor belt 1, along first and second scanning lines 3a and 3b which extend transversely with respect to the direction of movement 14 of the conveyor belt 1 and which extend over the entire width of the conveyor belt 1.

As can better be seen from FIG. 1, for that purpose arranged beneath the conveyor belt 1 are bar sensors 15 which are disposed in the direction of the scanning lines 3a, 3b and which can receive incident light from above, that is to say from the conveyor belt 1. As the sensors 15 comprise CCD-contact sensors in this embodiment, the bar sensors 15 are mounted directly at the underside of a fixedly mounted transparent glass plate 21, above which the conveyor belt 1 slides therealong at the smallest possible spacing.

Arranged on the other side of the conveyor belt 1, that is to say above it, and extending along the scanning lines 3a and 3b, are light sources in the form of light strips 16a, 16b which radiate light downwardly onto the conveyor belt 1. As the conveyor belt 1 is at least partially transmissive in relation to the light emitted by the light strips 16a, 16b, the bar sensors 15 register a light-dark change when one of the products 2a, 2b projects into or passes through a respective scanning line 3a, 3b. As the scanning operation is effected at short time intervals in comparison with the speed of travel of the belt, multiple measurement and multiple registration is effected when a product 2a which measures for example 2 cm in diameter passes through the assembly so that, when dealing with non-round products 2, it is even possible roughly to ascertain the rotational orientation thereof.

In order to be able to ascertain the product positions with the maximum degree of accuracy, it is desirable for the light from the light strips 16a, 16b to be incident onto the conveyor belt 1 in the form of light beams which are as parallel as possible, that is to say for example perpendicularly from above. For that purpose the light of the light strips 16a, 16b is focussed either by means of a suitably concavely shaped reflector 17 disposed behind the light strip for example as indicated at 16a, or the light is focussed by means of a lens 18 which is disposed in front of the light strip as indicated at 16b, in the direction of light emission, for orienting the light beams in parallel relationship.

The scanning effect along two scanning lines 3a and 3b is necessary for the reason that the bar sensors 15a–15e used are in the form of CCD-contact sensors which are available in large numbers and therefore used inexpensively in commercially available and conventional scanners for image and text archiving purposes.

Those bar sensors are of a length of 20–30 cm and it is therefore necessary to use a plurality of bar sensors in order to cover the entire width of the conveyor belt 1.

As can be seen from FIG. 2 therefore the bar sensors 15a, 15c, 15e disposed along the one scanning line 3a are arranged with such gaps between them that those gaps are somewhat shorter than the length of a bar sensor. By virtue of that configuration, arranging the other bar sensors 15b and 15d precisely in such a way as to cover those gaps on the other scanning line 3b means that it is possible to scan the entire width of the conveyor belt 1 without any gap in the scanning effect. It will be appreciated that the bar sensors of a scanning line 3a or 3b must be activated at the same time by way of a suitable computer connected to all the bar sensors 15a–15e, and the spatial displacement of the individual bar sensors relative to each other must also be taken into consideration by the computer 13.

Within the bar sensors 15, individual light-sensitive sensors 4a, 4b, . . . , generally CCD-sensors, are arranged in a row, only in the longitudinal direction of the bar sensors as indicated generally at 15, that is to say in the transverse direction of the conveyor belt 1.

By virtue of the fact that the light from the light strips 16a, 16b is irradiated in beams which are as parallel as possible in the direction of the light-sensitive sensors 4a, 4b, . . . , that is to say the bar sensors 15, and because those light-sensitive sensors 4a, 4b, . . . , are also arranged in a spatial configuration along substantially the entire width of the conveyor belt 1, there are no optical distortion effects and parallax phenomena in relation to optical signal processing. In that way products 2 of different configurations, irrespective of their height and lateral projections, can still be distinguished as separate products on the conveyor belt 1, down to a very small spacing relative to each other. Furthermore the expenditure involved in re-adjustment when replacing a bar sensor 15 is relatively low and in particular it is possible to eliminate expensive calibration procedures in such a situation.

CCD-contact sensors of that kind make it possible to effect a recognition or detection procedure with a degree of resolution of about 0.1 mm while still involving a limited level of financial expenditure, in particular when the apparatus uses CCD-sensors which are only capable of registering light-dark differences so that no color detection is required.

In many cases however color detection or recognition at least of the configuration on the top side of the products 2 is additionally needed.

In FIG. 2, unlike the arrangement shown in FIG. 1, the light strips 16a, 16b which are arranged above the conveyor belt 1, with reflector or lens, are not shown in order to simplify the view in FIG. 2, but rather FIG. 2 only shows the bar sensors 15 which are arranged beneath the conveyor belt 1.

To provide for color detection however a substantially lower degree of resolution is also generally sufficient, than for precisely determining the position of a product. Color detection can therefore be achieved in two different ways, in addition to use of CCD-sensors which only provide for precisely determining the positions of products on the conveyor belt 1.

Thus, referring to FIG. 2, shown in the region of the scanning lines 3a, 3b is an additional line camera 19 which, as is the usual practice, is suspended approximately over the center of the conveyor belt 1 and which scans the entire width of the conveyor belt 1 along a further scanning line 3c which is between the scanning lines 3a and 3b. The line camera 19 however only serves for color detection and therefore it is required to have a substantially lower degree of resolution, than when previously used for determining position. The line camera 19, instead of being arranged between the two scanning lines 3a, 3b for the bar sensors, can also be arranged downstream of the two scanning lines involved in determining product positions, and could therefore receive additional rough preliminary information about the position of the products whose surface color is to be detected, from the computer 13 which is also connected to the line camera.

Color detection is necessary in particular for the reason that it is possible to arrive at a distinction between different colors on the surfaces of different products 2a and 2b which are supplied on the conveyor belt in a mixed feed and which are of identical view in plan. Because of the fact that they are identical in plan view, it would not be possible to distinguish between the different kinds of products on the conveyor belt by virtue of light-dark scanning of the peripheries thereof by means of the CCD-sensors from the underside.

As shown in FIG. 2, another possible option in this respect involves arranging a camera as indicated at 20 or 20' on the robot 10 in the region of the free end of the arm thereof, that is to say as far as possible directly at the gripping device 9 or at the front end of the arm portion 10c of the robot 10. The absolute viewing direction of the camera 20 or 20' is known at any time by virtue of the camera viewing direction being known in relation to that of the gripping device 9 or the arm portion 10c, and the known instantaneous orientation of the arm of the gripping robot 10 and also its gripping device 9. The advantage of this construction is that in this case it is possible to use a camera with a limited field of view and thus also a low degree of resolution, as it is sufficient if recognition of the surface configuration of the product as indicated for example at 2a occurs only when the camera has moved fairly close to the product, which therefore is the case just before the product is gripped by the gripping device 9. In that case the color and/or the rotational position of the surface configuration of the product and thus the product itself relative to spatial axes or co-ordinates is then detected by means of the camera 20. As the camera 20 or 20' is also connected to the computer 13, in that way it is possible to communicate to the gripping device 9 the angular amount by which the product must be turned about a vertical axis after it has been picked up and before it is deposited in for example the tray 11a, so that for example square or rectangular products are deposited in the tray 11a in such a way that labelling on the top side of the product always faces in the same direction.

FIG. 3 shows the result when a product as indicated at 2x of square or rectangular configuration in plan passes through the scanning line 3a.

In that case the bar sensor on the scanning line 3a is activated at especially given time intervals and ascertains along the scanning line 3a a shadowed region which is shown as lines 23a, 23b, 23c, . . . on the plan-view surface of the product 2x.

Regardless of the speed of transportation movement of the conveyor belt 1 in the direction of movement 14, those lines 23 are at uniform spacings from each other provided that the line speed of the CCD-sensors is not exceeded. However the lengths and positions of the lines 23a, 23b, . . . , are different and when considered in combination give not only the rough position but also the rotational orientation of the plan-view surface of the product 2x insofar as the product is a product which is severely non-round, for example rectangular. In the case of a rectangular product however there are always two possible forms of actual positioning if the top side of the product is not of a configuration which is symmetrical with respect to the line of symmetry, such as for example lettering or labelling which can be read only from one side, as is illustrated in FIG. 2 by the labels x1, x2 on the respective products.

With a sufficiently high degree of resolution and sufficiently frequent activation of the light-sensitive sensors in comparison with the speed of movement of the product it is therefore possible in this way not only to roughly ascertain the position of a product on the conveyor belt 1 but also to determine the rotational orientation thereof.

It will be seen therefore that the above-described apparatus and the method of optically determining positions of products on a moving substrate or background surface such as a conveyor belt operates with at least substantially reduced optical distortion and is simple and inexpensive to implement, without requiring expensive calibration operations when replacing or re-adjusting components of the apparatus.

It will be appreciated that the above-described apparatus and method has been set forth solely by way of example and illustration of the principles of the present invention and that various modifications and alterations may be made therein without thereby departing from the spirit and scope of the invention.

What is claimed is:

1. Apparatus for optically determining the position of products on a background surface means moving relative thereto, including:
    at least one light source arranged above the background surface means for radiating light onto the moving background surface means, the light source being arranged along at least one scanning line which extends transversely with respect to the direction of movement of the background surface means; and
    a plurality of light-sensitive sensors arranged over the entire width of the background surface means in at least one row along at least one scanning line and adapted to register a light effect caused by the products as they pass through between the light source and the light-sensitive sensors.

2. Apparatus as set forth in claim 1 wherein said background surface means is a conveyor belt.

3. Apparatus as set forth in claim 1 wherein the background surface means is light-transmissive, and
    the light-sensitive sensors are arranged on the side of the background surface means remote from the light source and are adapted to register a shadow cast by products on the background surface means.

4. Apparatus as set forth in claim 1
wherein the light source is arranged on the side of the background surface means which carries the products and the light-sensitive sensors are arranged on the oppositely disposed side directly at the background surface means.

5. Apparatus as set forth in claim 1
wherein a plurality of light-sensitive sensors are combined in the form of a respective bar sensor.

6. Apparatus as set forth in claim 1
wherein the light-sensitive sensors are of the smallest possible extent in said direction of movement and light-sensitive sensors are arranged in a row relative to each other only in the direction of said at least one scanning line and thus transversely with respect to said direction of movement.

7. Apparatus as set forth in claim 1
wherein said light-sensitive sensors are CCD-sensors.

8. Apparatus as set forth in claim 5
wherein said light-sensitive sensors are CCD-sensors.

9. Apparatus as set forth in claim 8
wherein said bar sensor comprises a bar-shaped CCD-sensor.

10. Apparatus as set forth in claim 7
wherein CCD-sensors are CCD-contact sensors.

11. Apparatus as set forth in claim 8
wherein said CCD-sensors are CCD-contact sensors.

12. Apparatus as set forth in claim 1
wherein said sensors are arranged along first and second scanning lines which extend in parallel relationship and which are spaced in said direction of movement so that gaps formed in the transverse direction on one said scanning line between two successively occurring sensors are covered by sensors arranged on the other said scanning line.

13. Apparatus as set forth in claim 1
wherein the light source along said at least one scanning line is a light strip arranged at a spacing relative to said background surface means.

14. Apparatus as set forth in claim 13 including
optical means adapted to focus light irradiated by said light source in an at least substantially parallel condition and directed perpendicularly towards said background surface means.

15. Apparatus as set forth in claim 14
wherein said optical means comprises a reflector.

16. Apparatus as set forth in claim 14
wherein said optical means comprises a lens.

17. Apparatus as set forth in claim 1
wherein the extent of said sensors in said direction of movement is very small in relation to the size of said products.

18. Apparatus as set forth in claim 1
wherein the extent of said sensors in the transverse direction relative to the background surface means is very small in relation to the size of said products.

19. Apparatus as set forth in claim 1 and further including
a computing means operatively connected to said sensors for computing the position of products on the background surface means and optionally their rotational orientation relative to said direction of movement.

20. Apparatus as set forth in claim 19 and further including
a gripping means for gripping products on the background surface means, operatively connected to the computing means.

21. Apparatus as set forth in claim 1 and further including
at least one color-sensitive line camera arranged at a spacing relative to said background surface means and adapted for color detection of the surface of products passing through beneath a further scanning line.

22. Apparatus as set forth in claim 21
wherein said further scanning line is between first and second other scanning lines.

23. Apparatus as set forth in claim 19 and further including a gripping means for gripping products, the gripping means being movable relative to the background surface means, and a color-sensitive camera connected to the computing means and having a viewing direction known relative to said gripping means.

24. A method for optically detecting the position of products on a background surface means moving relative thereto wherein the background surface means is irradiated by light on at least one scanning line extending transversely with respect to said direction of movement, and a light effect produced by said products is registered by a plurality of light-sensitive sensors arranged over the entire width of the background surface means along said scanning line.

25. A method as set forth in claim 24 wherein the background surface means is light-transmissive and said sensors are arranged on the side thereof remote from the light-irradiation side.

26. A method as set forth in claim 24 wherein color recognition of the top side of the products is effected along at least one scanning line extending transversely with respect to said direction of movement.

27. A method as set forth in claim 24 wherein small-area color recognition of the top side of the products is effected when a product-gripping means approaches a product to be gripped, said recognition being implemented by said gripping means itself.

\* \* \* \* \*